(12) United States Patent
Henmi et al.

(10) Patent No.: US 8,652,437 B2
(45) Date of Patent: Feb. 18, 2014

(54) METHOD OF MANUFACTURING ARTIFICIAL ZEOLITE

(75) Inventors: Teruo Henmi, Matsuyama (JP);
Takayuki Nakamura, Yokohama (JP);
Toshiaki Ubukata, Utsunomiya (JP);
Hirokuni Matsuda, Odawara (JP);
Shuji Tada, Kawagoe (JP)

(73) Assignee: Prometron Technics Corp. (JP)

( * ) Notice: Subject to any disclaimer, the term of this patent is extended or adjusted under 35 U.S.C. 154(b) by 0 days.

(21) Appl. No.: 11/890,036

(22) Filed: Aug. 3, 2007

(65) Prior Publication Data

US 2009/0016955 A1 Jan. 15, 2009

Related U.S. Application Data

(63) Continuation-in-part of application No. 11/475,369, filed on Jun. 27, 2006.

(51) Int. Cl.
*C01B 39/02* (2006.01)

(52) U.S. Cl.
USPC ........... 423/703; 423/710; 423/714; 423/718; 502/25; 502/60; 502/64; 502/71; 502/164

(58) Field of Classification Search
USPC ................... 423/700, 703, 712; 428/372, 375
See application file for complete search history.

(56) References Cited

U.S. PATENT DOCUMENTS

| | | | | |
|---|---|---|---|---|
| 4,592,902 A | * | 6/1986 | Valyocsik | 423/706 |
| 6,238,790 B1 | * | 5/2001 | Smith et al. | 428/379 |
| 6,299,854 B1 | * | 10/2001 | Henmi et al. | 423/700 |
| 6,596,909 B2 | * | 7/2003 | Nishijima et al. | 568/917 |
| 6,663,845 B1 | * | 12/2003 | Hasuyama et al. | 423/700 |
| 6,692,722 B2 | * | 2/2004 | Ando et al. | 423/700 |

FOREIGN PATENT DOCUMENTS

JP 2000-335916 * 12/2000

* cited by examiner

*Primary Examiner* — Melvin C Mayes
*Assistant Examiner* — Colette Nguyen
(74) *Attorney, Agent, or Firm* — Wood, Phillips, Katz, Clark & Mortimer (57) ABSTRACT

A method of manufacturing an artificial zeolite. The method includes the steps of: heating a waste insulator to form a molten insulator; quenching and pulverizing the molten insulator; and heat treating the quenched and pulverized insulator in an alkaline aqueous solution.

14 Claims, 6 Drawing Sheets

METHOD OF MANUFACTURING ARTIFICIAL ZEOLITE

BACKGROUND OF THE INVENTION

1. Field of the Invention

The present invention relates to an artificial zeolite that is a solid acid catalyst and a method of manufacturing the same.

2. Background Art

Zeolite has been utilized for adsorption and separation of various substances and is also known as a solid acid catalyst. One particular zeolite is capable of decomposing nitrogen oxide (NOx) into nitrogen and oxygen. The nitrogen oxide (NOx) generated in an internal combustion engine can be decomposed by the catalyst before a gas containing the nitrogen oxide is discharged to the atmosphere.

A zeolite of ZSM-5 is well known as a high performance solid acid catalyst. ZSM-5 has a catalytic function to promote chemical reactions such as hydrocarbon isomerization, alkylation, and catalytic cracking of hydrocarbons.

However, ZSM-5 is relatively expensive to manufacture. The raw materials from which ZSM-5 is conventionally made are themselves relatively expensive. To make production of ZSM-5 practical, costs must be controlled. In JP-2000-335916-A, the applicant discloses a method of manufacturing an artificial zeolite from slag of a raw material.

Waste insulator material exists in considerable volume. Waste insulator is currently recycled to raw materials of blocks, tiles and building materials. The insulator has very high insulation qualities, compared to general ceramics.

SUMMARY OF THE INVENTION

In one form, a method of manufacturing an artificial zeolite is provided. The method includes the steps of: heating a waste insulator to form a molten insulator; quenching and pulverizing the molten insulator; and heat treating the quenched and pulverized insulator in an alkaline aqueous solution.

In one form, the molten insulator consists of silicon and aluminum. The method further includes the step of adjusting a ratio of silicon content with respect to aluminum content prior to the heat treatment in the alkaline aqueous solution.

In one form, the quenched and pulverized insulator is heat treated under pressure at a temperature above 100° C.

In one form, the waste insulator is heated in a plasma furnace to form the molten insulator.

In one form, the molten insulator is quenched into water.

In one form, the alkaline aqueous solution has at least one template agent selected from:

a compound having the formula (1)

formula (1)

a combination A of a compound having the formula (2)

formula (2)

a compound having the formula $R_8X$, and a compound having the formula $R_{14}COR_{15}$;

a combination B of a compound having the formula $R_9NHR_{10}$, a compound having the formula $R_{11}X$, and a compound having the formula $R_{14}COR_{15}$; and a combination C of a compound having the formula $NH_2R_{12}$, a compound having the formula $R_{13}X$, and a compound having the formula $R_{14}COR_{15}$, where $R_1$-$R_{15}$ are alkyl groups and X is a halide or hydroxide ion.

In one form, $R_1$-$R_4$ have the same alkyl group with a carbon number of 2-5.

In one form, the waste insulator is a waste insulator used for transmitting electric power that is either high voltage or non-industrial voltage and containing silicon.

In one form, the method includes the step of crushing the waste insulator into particles with a size in the range of 0.01 mm-5 mm.

In one form, the ratio of silicon content with respect to aluminum content is adjusted by adding at least one of silicon- and aluminum-containing inorganic compounds to the waste insulator.

In one form, this ratio is adjusted by using hydrochloric acid.

In one form, the silicon (Si) and aluminum (Al) are present in the waste insulator in a ratio (Si/Al) of 1-5.

In one form, the artificial zeolite has a ratio (Si/Al) of 7.5-5000.

In one form, the waste insulator consists of ketone and silicon with the ketone present relative to silicon in a weight ratio of 0.01-5.

In one form, a method of manufacturing an artificial zeolite is provided. The method includes the steps of: treating a waste insulator to form a molten waste insulator; quenching and pulverizing the molten insulator; and heat treating the quenched and pulverized insulator in a solution so as to produce the artificial zeolite.

In one form, the molten insulator consists of silicon and aluminum. The method further includes the step of adjusting a ratio of silicon content with respect to aluminum content prior to the heat treatment step.

In one form, the waste insulator is a waste insulator used for transmitting electric power that is either high voltage or non-industrial voltage and containing silicon.

In one form, the ratio of silicon content to aluminum content is adjusted by adding at least one of silicon- and aluminum-containing inorganic compounds to the waste insulator.

In one form, the silicon (Si) and aluminum (Al) are present in the waste insulator in a ratio (Si/Al) of 1-5.

In one form, the artificial zeolite has a ratio (Si/Al) of 7.5-5000.

DETAILED DESCRIPTION OF THE PREFERRED EMBODIMENTS

The inventive method utilizes waste insulator material as a starting component. A conventional insulator, used in the transmission of electric power, that is either a high voltage, or non-industrial voltage, contains silicon and aluminum. These insulators generally are made from a porcelain material and include a metal part bonded with an adhesive agent, such as cement. Sulfur is sometimes applied to the insulator. To re-use the insulator material, it is necessary to remove these materials and dirt. Since organic compounds are removed during high temperature processing, it may be unnecessary to remove them prior to heat treatment.

The waste insulator is usually crushed into particles with a size in the range of 0.01 mm-5 mm. If the waste insulator is melted in a large furnace, the crushing step may be unnecessary.

Generally, the waste insulator material contains an adequate amount of silicon for zeolite production. However, waste insulator material may contain too much or too little aluminum to manufacture zeolite. The content of silicon or aluminum in the insulator may be adjusted with a silicon-supplying raw material (silicon-containing inorganic compound) or aluminum-supplying raw material (aluminum-containing inorganic compound).

The silicon-supplying raw material may be waste optical fibers, waste silicon dioxide fine powder (white soot), and/or a tip material (waste silica glass). White soot is formed by processing optical fiber using a soot method. The tip material is produced through a drawing process performed on the optical fiber. It is preferable to pulverize the waste optical fiber when it is added after melting and pulverizing the insulator. Finer powder made from the optical waste fiber may be used, if required.

The aluminum-supplying raw material may include any one or more of coal ash, pulverized clay stone, pulverized china, pulverized porcelain, aluminum dross, and waste metal aluminum.

When the silicon-containing and aluminum-containing inorganic compounds are melted together with the waste insulator, it is preferable to adjust the size of the particles so that they are approximately the same as that of the waste insulator.

When the raw materials other than the insulator are not crystalline, or have a small size crystal, they may be pulverized and added to the insulator after melting and cooling of the insulator. It is essential to adjust the content of silicon and aluminum of the raw material prior to heat treatment in an alkaline aqueous solution.

As an alternative to adding the silicon- and aluminum-containing inorganic compounds to the waste insulator, hydrochloric acid may be utilized to control the content of silicon and aluminum of the waste insulator prior to, or after, melting and quenching of the waste insulator. Either method may be used.

The addition of the silicon- and/or aluminum-containing inorganic compounds, referred to as sub-raw materials, to the waste insulator, prior to or after melting and quenching of the insulator, is performed to adjust the ratio of the Si-content to Al-content of the raw material (referred to Si/Al ratio) to be 1-5, thereby to achieve an effective yield of the zeolite. The Si/Al ratio for the zeolite is adjusted to be in the range of 7.5-5000 to achieve a high performance solid acid catalyst, of zeolite such as ZSM-5.

The waste insulator can be melted with conventional heating means. A plasma furnace is effective for heating and melting the raw material. There are several currently available types of plasma furnaces, such as oxygen plasma furnaces, air plasma furnaces, or argon plasma furnaces. The air plasma furnace has a relatively low operating cost and is capable of effectively removing organic compounds adhered to the raw material.

The waste insulator and the sub-raw materials become completely melted when heated at high temperatures over an adequate time period. When the melting is not complete and crystals of the raw material remain, efficiency and yield through the process, including heat treatment in an alkaline aqueous solution, are considerably reduced. The temperature for melting the raw material is usually in the range of 1300-2000° C., and more preferably 1500-2000° C., but depends upon the nature of the waste insulator.

The molten raw material is quenched in water to obtain a glassy pulverized material. The water is desirable from the standpoint of cost, safety, ease of processing, and in terms of the design of the equipment to carry out the process. When the quenching is not satisfactory, or there is only moderate quenching, crystals are generated, resulting in a considerable decrease in the efficiency and yield through the process (heat treatment in the alkaline aqueous solution).

The quenched raw material becomes glassy and very fine and may be further pulverized to improve a reaction rate during heat treatment in the alkaline aqueous solution, if necessary. The desirable grain size is in the range of 0.1 μm-0.1 mm.

The glassy raw material is heat treated in the alkaline aqueous solution to elute the silicon component and aluminum component into the solution to form the zeolite.

The radius of an alkaline metal, and also of a hydrated ion thereof, of the alkaline aqueous solution, affects a pore size of the zeolite. Thus, the alkaline metal is selected to produce the desired zeolite. Sodium oxide and/or potassium hydroxide are usually utilized to achieve high reaction rate at relatively low cost.

The alkaline metal in the alkaline aqueous solution makes the silicon and aluminum of the raw material elute in the solution and results in the formation of a main structure having tetrahedrons of Si—O and Al—O.

The reaction temperature is preferably at least 60° C., and more preferably 100-250° C. A reaction temperature less than 100° C. requires a long heat treatment time while a reaction temperature more than 250° C. generally requires expensive processing apparatus. The reaction temperature is more preferably 140-180° C. As the reaction temperature increases, the grain size of the zeolite becomes larger.

When forming commonly used zeolite through the heat treatment in the alkaline aqueous solution of the present invention, the Si/Al ratio of the raw material is adjusted for adapting to the desired, resulting zeolite. When the zeolite of the solid acid catalyst, such as high performance ZSM-5, is formed, a template agent is utilized. It is noted that the addition of the template agent to the alkaline aqueous solution may alter the optimum concentration of the alkaline metal of the alkaline aqueous solution.

The template agent plays an important role in determining shape and size of the fine pores of the solid acid catalyst. The main structure formed with the tetrahedrons of Si—O and Al—O surrounds the template so that the selection of shape and size of the template is important.

In one form, the template agent of the present invention utilizes quarternary ammonium salt or a combination of a compound having the same structure as quarternary ammonium salt. Examples of suitable template agents are: a compound having the formula (1)

formula (1)

a combination A of a compound having the formula (2)

formula (2)

a compound having the formula $R_8X$, and a compound having the formula $R_{14}COR_{15}$; a combination B of a compound having the formula $R_9NHR_{10}$, a compound having the formula $R_{11}X$, and a compound having the formula $R_{14}COR_{15}$; and a combination C of a compound having the formula $NH_2R_{12}$, a compound having the formula $R_{13}X$, and a compound having the formula $R_{14}COR_{15}$, where $R_1$-$R_{15}$ are alkyl groups and X is a halide or hydroxide ion.

Preferably, the quarternary ammonium salt, and the combination of the compounds having the same structure as the quarternary ammonium salt, have the tetrahedron structure to avoid damage to the main structure of the tetrahedrons of Si—O and Al—O of the solid acid catalyst.

When combination A is utilized for the template agent, $R_5$-$R_8$ have preferably the same alkyl group. The carbon number thereof is 2-5 to enhance catalytic function of the solid acid catalyst.

When combination B is utilized for the template agent, $R_9$-$R_{11}$ have preferably the same alkyl group. The carbon number thereof is 2-5. The ratio of the compound of formula (2) to the compound of $R_8X$ is preferably 1:2 or near to that ratio.

When the combination C is utilized for the template agent, $R_{12}$ and $R_{13}$ have preferably the same alkyl group. The carbon number thereof is 2-5. The ratio of the compound $NH_2R_{12}$ to the compound $R_{13}X$ is preferably 1:3 or near that ratio.

Preferably, $R_{14}COR_{15}$ of the combinations A-C is a ketone. $R_{14}$ and $R_{15}$ can be the same, and preferably are the same as alkyl group of amine utilized in the combinations A-C.

The weight ratio of the ketone is 0.01-5 with respect to the weight of silicon in the raw material. When the weight ratio is less than 0.01, the reaction rate decreases, resulting in a low yield. When the weight ratio is more than 5, a reaction among the organic compounds, or side reaction, occurs and wastes the raw material, or prevents the reaction of the solid acid catalyst.

Any one of the above templates can be utilized alone, or a combination containing at least any two of the template agents can be utilized.

The weight ratio of the template agent is adjusted to 0.1-0.5 with respect to the weight of silicon in the raw material. When the weight ratio is less than 0.1, the reaction rate decreases and results in low yield. When the weight ratio is more than 0.5, a reaction between the organic compounds, or side reaction, occurs and decreases the effect of the template agent or prevents the reaction of the solid acid catalyst. Preferably, the weight ratio of the template agent is in the range of 0.15-0.45.

The method of manufacturing the high performance solid acid catalyst zeolite, such as the ZSM-5, according to the present invention, may include a compound with the formula $R_{14}COR_{15}$, or ketone, where $R_{14}$ and $R_{15}$ are alkyl groups. $R_{14}$ and $R_{15}$ can be the same and have a carbon number of 2-10. One example of ketone is diethyl ketone.

The raw material contains the ketone in a weight ratio of 0.01-5 with respect to the weight of silicon. When the weight ratio of ketone to silicon is less than 0.01, the reaction rate decreases and results in low yield. When the weight ratio is more than 5, reaction between the organic compounds, or side reaction, occurs and wastes the raw material or prevents the reaction of the solid acid catalyst.

The raw material (quenched insulator, and the sub-raw material if necessary), the template, and the ketone are reacted together in the alkaline aqueous solution to produce the desired zeolite.

The volume of water is adjusted to facilitate stirring of the reaction liquid. A large volume of water delays the reaction whereas a small volume thereof causes a non-uniform reaction.

The raw material containing the additives is placed in a closed chamber (reactor chamber) and heated to form the solid acid catalyst having the main structure formed with the tetrahedrons of Si—O and Al—O.

The reaction time is determined beforehand. For example, at 140° C., the reaction time is usually 30 minutes to a few hours. The reaction time generally becomes longer and shorter as the temperature of the heat treatment becomes lower and higher, respectively.

After heat treatment, and usually after cooling, the reactant is removed from the reactor chamber, washed with water and alcohol, and dried.

When the template agent is utilized for the reaction, it is necessary to remove the template agent from the crystal structure of the zeolite.

The template agent, which remains in the main structure of the tetrahedrons of Si—O and Al—O, is oxidized with oxygen in the atmosphere, for example oxygen gas in air, and removed with oxidization. The heat treatment is carried out at a temperature of at least 500° C. but generally below 600° C., to control manufacturing costs. This temperature is required since the main structure has significant heat resistance.

When the Si/Al ratio is low and the zeolite has a low heat resistance, a wet oxidation method may be utilized to remove the template agent. The wet oxidation is, for example, by means of an oxidant such as hydrogen peroxide solution of 30%.

In some cases, the template agent can be carbonized in the non-oxidizing atmosphere.

EXAMPLE 1

A waste insulator for transmitting electric power of high voltage is utilized after removing the metal part, cement, and dirt. The waste insulator is then crushed into grains with a size of 2-4 mm. The Si/Al ratio is 2.9.

10 Kg of crushed insulator is melted in an air plasma furnace at a temperature of 1600° C. The molten insulator is quenched with water (about 1 m³) at ambient temperature through a gate disposed on a bottom portion of the furnace.

The molten insulator is pulverized to a grain size of 2-5 mm when quenched. The quenched insulator is further pulverized with a pulverizer (product of HOSOKAWA POWDER TECHNOLOGY RESEARCH INSTITUTE) to achieve a grain size of 1-100 μm with a mean diameter of 40 μm.

An aqueous sodium hydroxide of 2.5 mol/L is added to 4 kg of the pulverized insulator A so that the pulverized insulator becomes a slurry, which is stirred and heat treated.

Heat treatment is carried out in a pressure chamber at 160° C. for 2 hours while the slurry is stirred. The reactant α is washed thoroughly with water and dried. The final product weight is 3.8 Kg.

Figure 1:
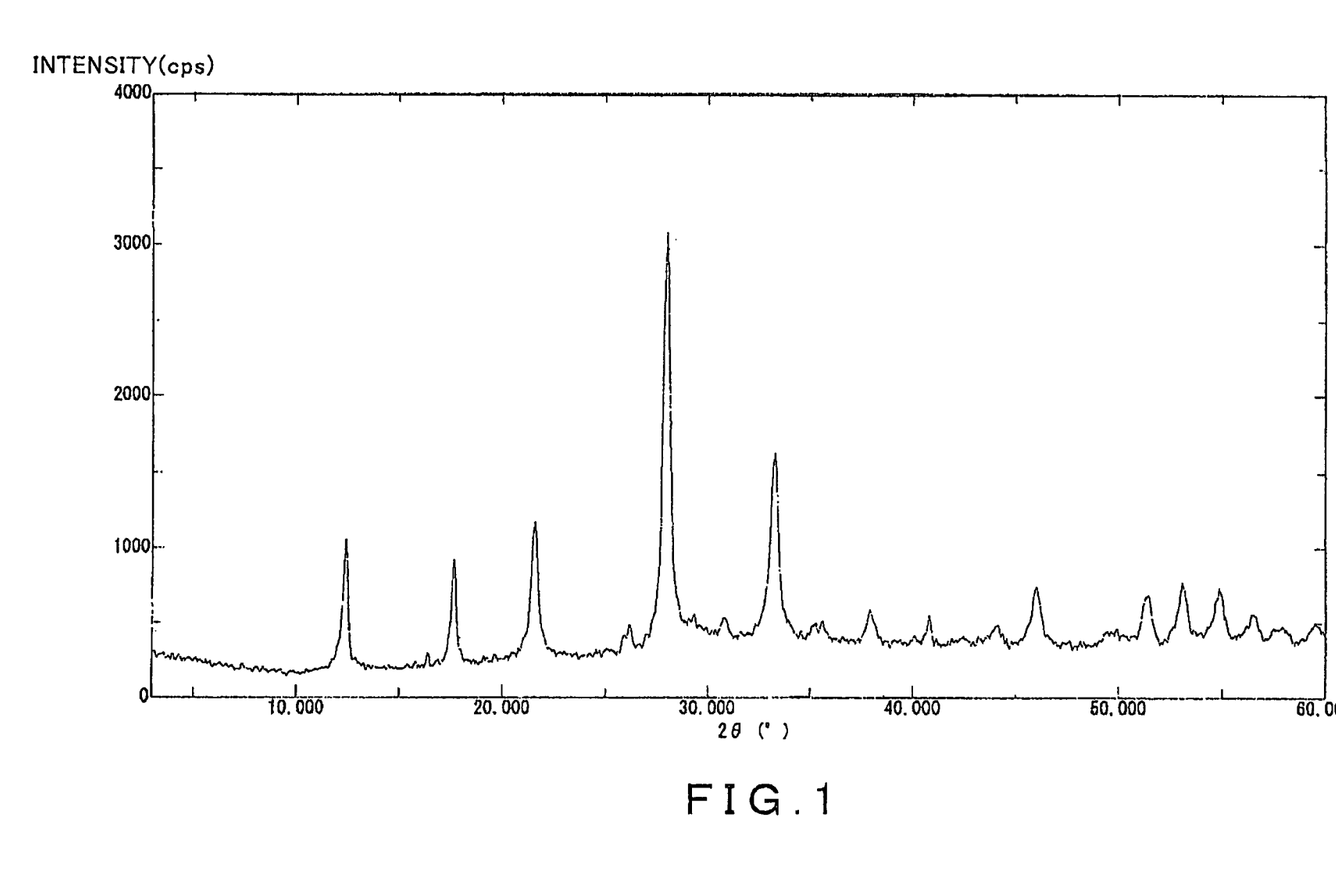
FIG. 1 is a diffraction pattern of one form of zeolite, made according to the invention.
Figure 2:
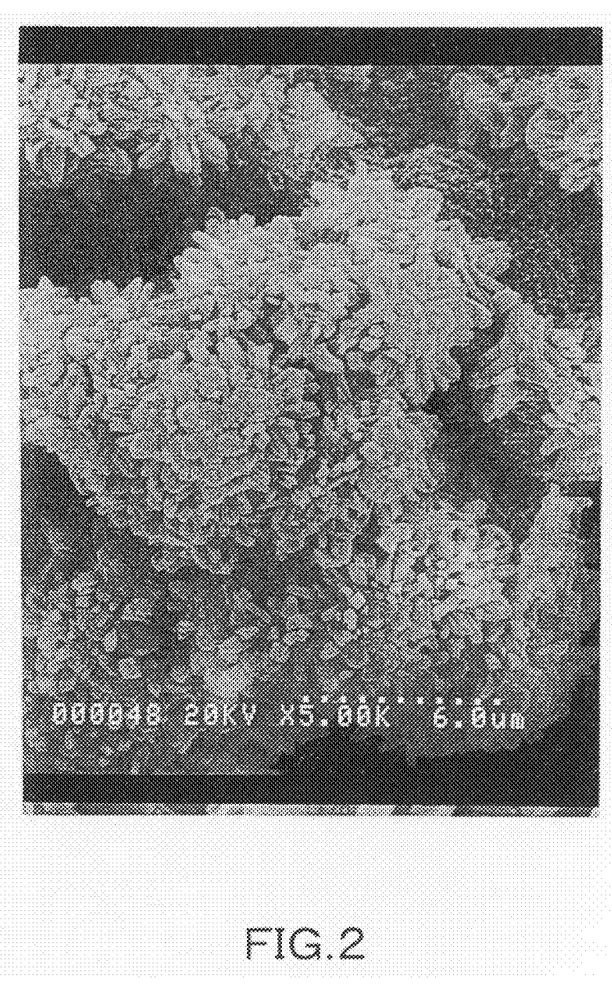
FIG. 2 is a scanning electron micrograph of the zeolite in FIG. 1.

The reactant α is analyzed through X-ray diffraction analysis. FIG. 1 shows the result. The diffraction pattern demonstrates that the reactant α is an Na—P1 type zeolite. FIG. 2 shows a scanning electron micrograph of the reactant α.

EXAMPLE 2

50 g of the waste optical fiber (silica glass) is added to 120 g of the above quenched and pulverized insulator A to make the Si/Al ratio 3.2. The mixture is reacted in the aqueous sodium hydroxide in the same way as for Example 1 and a reactant β of 140 g is obtained.

Figure 3:
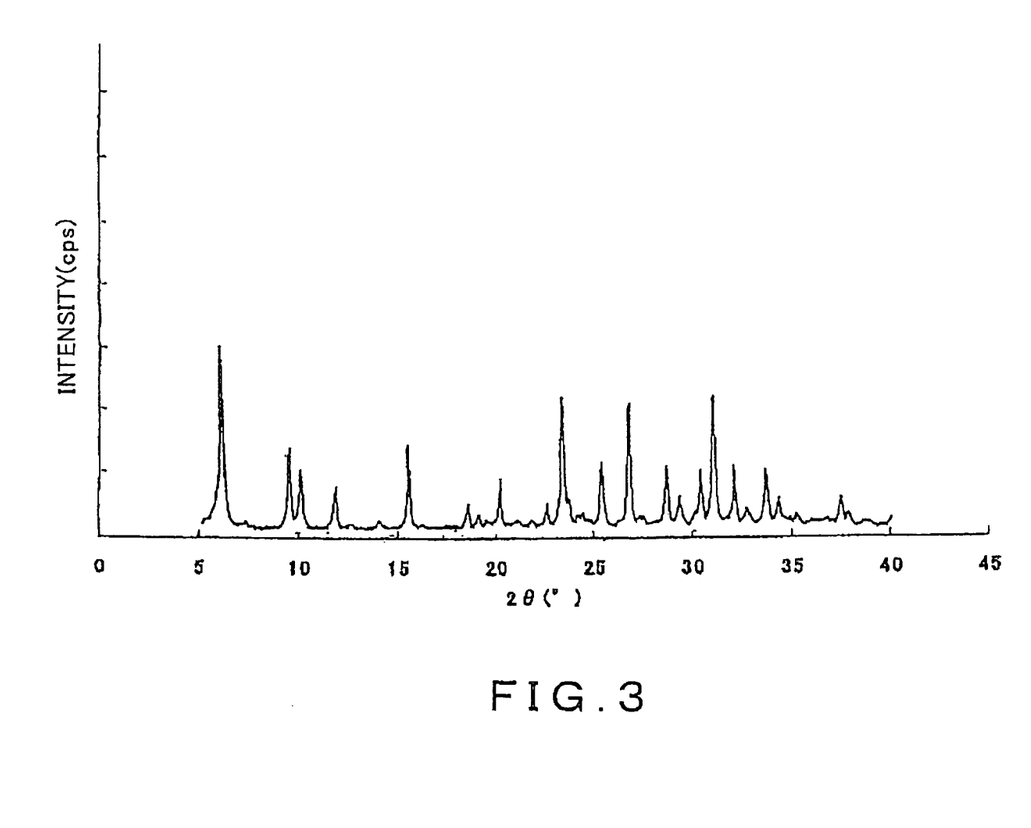
FIG. 3 is a diffraction pattern of another form of zeolite, made according to the invention.
Figure 4:
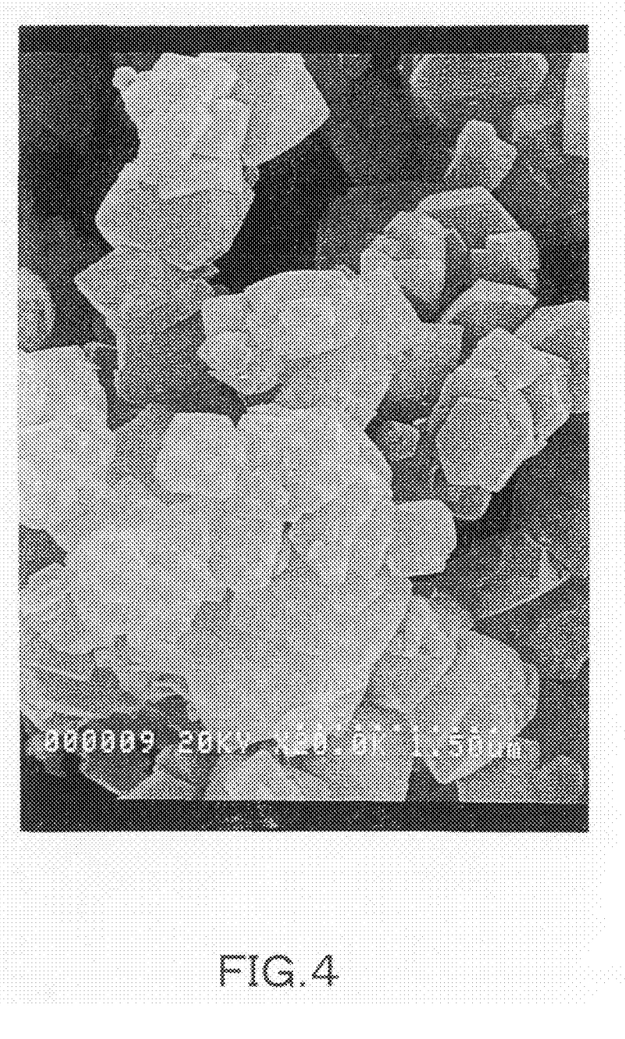
FIG. 4 is a scanning electron micrograph of the zeolite in FIG. 3.

FIG. 3 shows the result of X-ray diffraction analysis of the reactant β. The diffraction pattern demonstrates that the reactant β is faujasite type zeolite. A scanning electron micrograph of the same is shown in FIG. 4.

EXAMPLE 3

4 kg of pulverized optical fiber, as the silicon-containing inorganic compound, is added to 40 g of the quenched and pulverized insulator A obtained in Example 1, to make the Si/Al ratio 103.

Tetra-propyl-ammonium bromide is selected for the template. 3 kg of the tetra-propyl-ammonium bromide and the alkaline aqueous solution, which contains 400 g of sodium hydroxide and 75 kg of water, are added to the mixture of the insulator and optical fiber. The mixture, the template, and the alkaline aqueous solution are loaded into a pressure chamber and heat treated at 160° C. for 2 hours, while stirring them.

Figure 5:
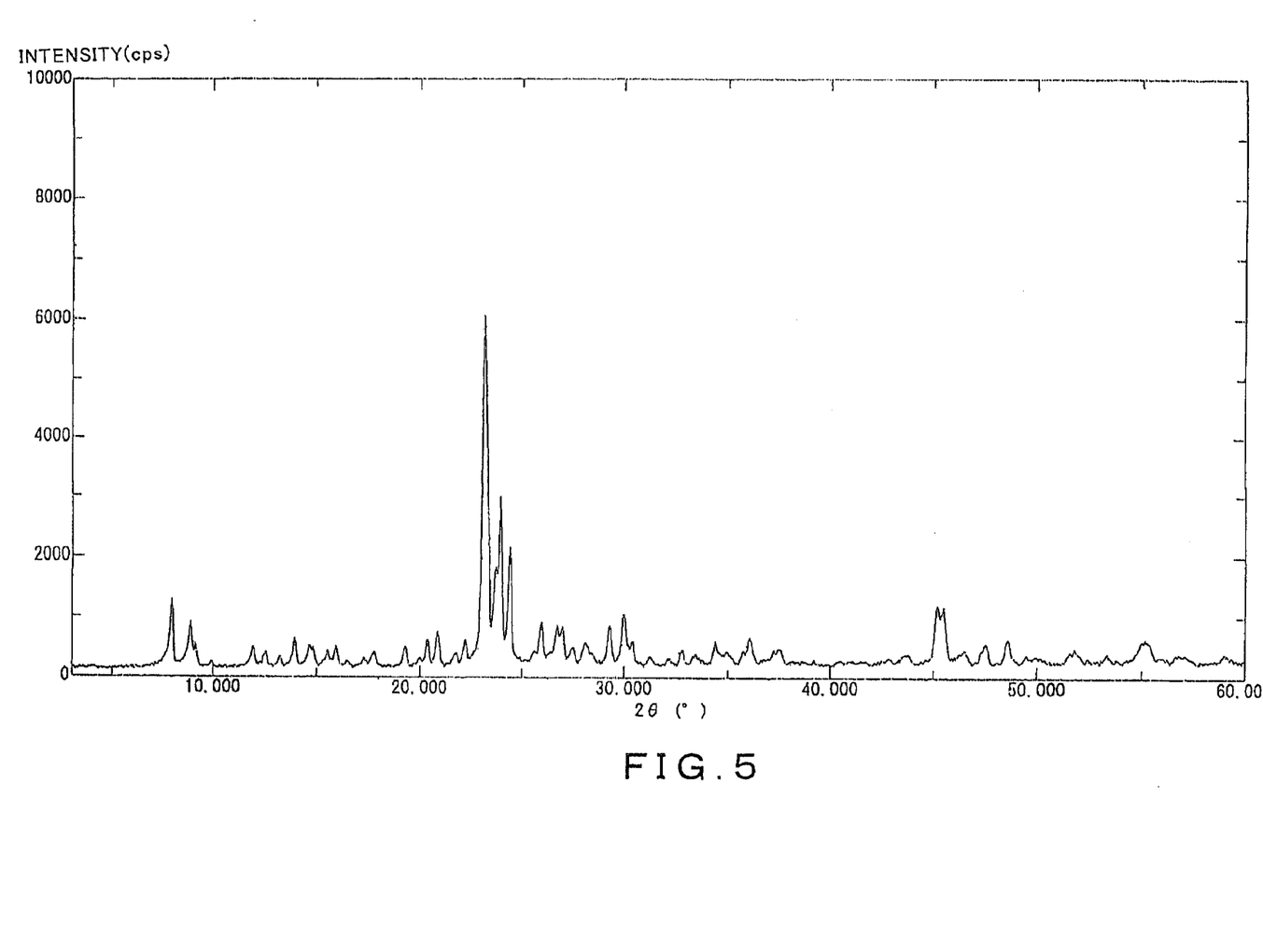
FIG. 5 is a diffraction pattern of still another form of zeolite, made according to the invention.
Figure 6:
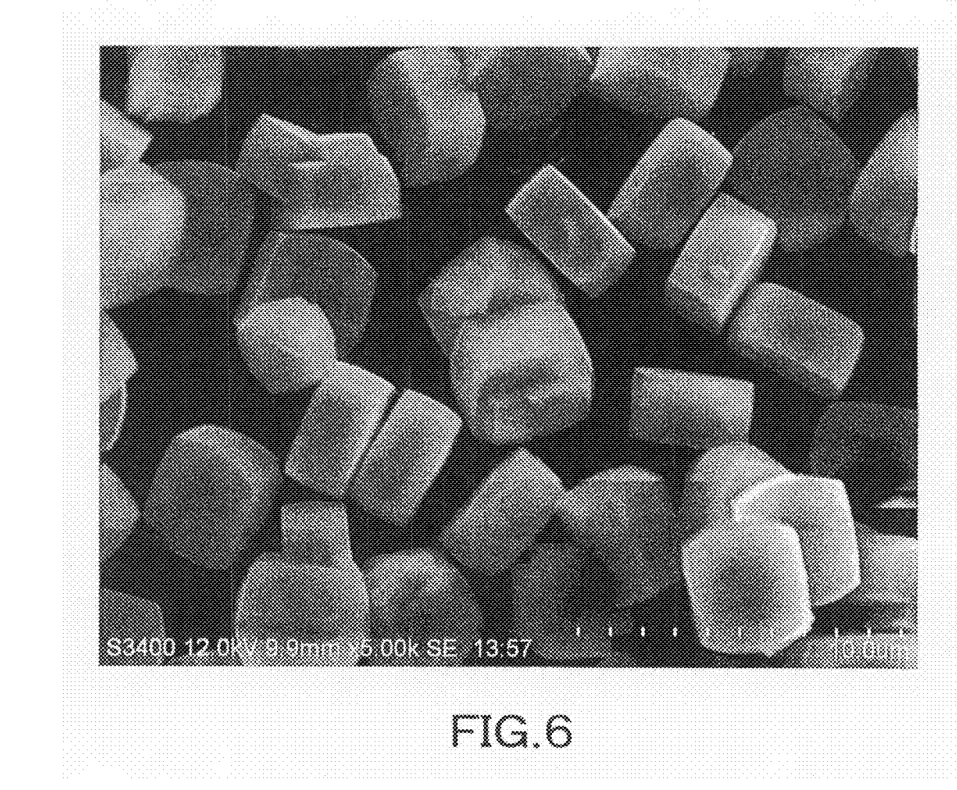
FIG. 6 is a scanning electron micrograph of the zeolite in FIG. 5.

The resulting reactant is filtered and dried. The weight of the dried reactant γ is 4 Kg. FIG. 5 shows an X-ray diffraction pattern for the reactant γ. The diffraction pattern of FIG. 5 corresponds to that of the ZSM-5 and confirms that the reactant γ is ZSM-5 type zeolite. FIG. 6 shows a scanning electron micrograph of the reactant γ.

EXAMPLE 4

200 g of the quenched and pulverized insulator A of Example 1 is added to hydrochloric acid (6 mol/L) for heat treatment of dealuminization. The dealuminized insulator, or an acid-treated insulator B, is thoroughly washed with water. The acid treated insulator has an Si/Al ratio of 100.

37 g of the tetra-propyl-ammonium bromide and the alkaline aqueous solution, which contains 5 g of sodium hydroxide and 1 g of water, is added to the acid treated insulator B. The acid treated insulator B, the template, and the alkaline aqueous solution are loaded into a pressure chamber for heat treatment at 160° C. for 2 hours, while stirring them.

The resulting reactant is filtered and dried. The dried reactant δ has a weight of 50 g. An X-ray diffraction pattern of the reactant δ is same as that of FIG. 5, which corresponds to the ZSM-5 type zeolite, and confirms that the reactant δ is ZSM-5 type zeolite.

The present invention provides a method of manufacturing artificial zeolite with the use of a waste insulator. The manufactured artificial zeolites cover a variety of zeolites. The method potentially easily and quickly produces the artificial zeolites.

The foregoing disclosure of specific embodiments is intended to be illustrative of the broad concepts comprehended by the invention.

The invention claimed is:

1. A method of manufacturing an artificial zeolite which produces an X-ray diffraction pattern of a ZSM-5 type zeolite, the method comprising the steps of:
   heating a waste insulator used for high voltage or non-industrial voltage and containing silicon at a temperature of between 1300 to 2000 degrees C. to form a molten insulator, wherein the molten insulator comprises silicon and aluminum;
   quenching and pulverizing the molten insulator;
   adjusting a ratio of silicon content with respect to aluminum content; and
   heat treating the quenched and pulverized insulator at a temperature of at least 60 degrees C. in an alkaline aqueous solution, wherein said artificial zeolite has a ratio (Si/Al) of 7.5-5000, and wherein the alkaline aqueous solution comprises sodium hydroxide to which tetra-propyl ammonium and ketone are added.

2. The method according to claim 1 wherein the quenched and pulverized insulator is heat treated at a temperature of at least 100 degrees C.

3. The method according to claim 2, wherein the waste insulator is heated in a plasma furnace to form the molten insulator.

4. The method according to claim 2, wherein the molten insulator is quenched into water.

5. The method according to claim 2 further comprising the step of crushing the waste insulator into particles with a size in the range of 0.01 mm-5 mm.

6. The method according to claim 2 wherein the ratio of silicon content to aluminum content is adjusted by adding at least one of silicon—and aluminum—containing inorganic compounds to the waste insulator.

7. The method according to claim 2 wherein the ratio of silicon content to aluminum content is adjusted by using hydrochloric acid.

8. The method according to claim 2 wherein the silicon (Si) and aluminum (Al) are present in the waste insulator in a ratio (Si/Al) of 1-5.

9. The method according to claim 1 wherein the waste insulator is a waste porcelain insulator.

10. The method according to claim 1, wherein weight ratio of the ketone is 0.01-5 with respect to weight of the silicon in a raw material.

11. A method of manufacturing an artificial zeolite which produces an X-ray diffraction pattern of a ZSM-5 type zeolite, the method comprising the steps of:
   crushing a waste insulator used for high voltage or non-industrial voltage and containing silicon into particles with a size in the range of 0.01 mm-5 mm;
   heating the waste insulator in a plasma furnace at a temperature of between 1300 to 2000 degrees C. to form a molten insulator, wherein the molten insulator comprises silicon and aluminum;
   quenching the molten insulator into water and pulverizing the molten insulator; adjusting a ratio of silicon content with respect to aluminum content to be 7.5-5000 by using hydrochloric acid or by adding at least one of silicon- and aluminum- containing inorganic compounds to the waste insulator; and heat treating the quenched and pulverized insulator at a temperature of at least 60 degrees C. in an alkaline aqueous solution, wherein said artificial zeolite has a ratio (Si/Al) of 7.5-5000, and wherein the alkaline aqueous solution comprises sodium hydroxide to which tetra-propyl ammonium and ketone are added.

12. The method according to claim 11 wherein the quenched and pulverized insulator is heat treated at a temperature of at least 100 degrees C.

13. The method according to claim 11 wherein the waste insulator is a waste porcelain insulator.

14. The method according to claim 11, wherein weight ratio of the ketone is 0.01-5 with respect to weight of the silicon in a raw material.

* * * * *